United States Patent [19]

Watanabe et al.

[11] Patent Number: 4,560,729

[45] Date of Patent: Dec. 24, 1985

[54] RUBBER COMPOSITION

[75] Inventors: Noboru Watanabe; Yoichiro Kubo, both of Yokohama, Japan

[73] Assignee: Nippon Zeon Co. Ltd., Tokyo, Japan

[21] Appl. No.: 662,684

[22] Filed: Oct. 19, 1984

[30] Foreign Application Priority Data

Oct. 19, 1983 [JP] Japan ................................ 58-195412

[51] Int. Cl.$^4$ ............................................ C08F 279/02
[52] U.S. Cl. .................................... 525/233; 525/305; 525/313; 525/315; 525/377
[58] Field of Search ............... 525/305, 313, 315, 377, 525/233

[56] References Cited

U.S. PATENT DOCUMENTS

| | | | |
|---|---|---|---|
| 3,449,470 | 6/1969 | Grabowski | 525/315 |
| 3,607,981 | 9/1971 | Morris | 525/315 |
| 3,950,454 | 4/1976 | Hensley et al. | 525/315 |
| 3,992,014 | 11/1976 | Retford | 525/313 |
| 4,020,039 | 4/1977 | Dunn et al. | 525/305 |
| 4,218,548 | 8/1980 | Mageli et al. | 525/313 |

*Primary Examiner*—Joseph L. Schofer
*Assistant Examiner*—Bernard Lipman
*Attorney, Agent, or Firm*—Sherman & Shalloway

[57] ABSTRACT

A rubber composition having improved steam resistance comprising a nitrile group-containing hydrocarbon rubber having an iodine number of not more than 120, an organic peroxide vulcanizer and a crosslinking coagent, the amount of said crosslinking coagent being 8 to 30 parts by weight per 100 parts by weight of said rubber.

11 Claims, No Drawings

RUBBER COMPOSITION

This invention relates to a rubber composition having improved steam resistance comprising a nitrile group-containing hydrocarbon rubber having a low concentration of unsaturated double bonds, an organic peroxide vulcanizer and a crosslinking coagent.

Nitrile group-containing highly saturated hydrocarbon rubbers resulting from hydrogenation of some or all of the carbon-carbon double bond-containing monomeric units of nitrile group-containing hydrocarbon rubbers (for example, an acrylonitrile-butadiene copolymer rubber—to be sometimes abbreviated NBR hereinafter) or replacing them by other ethylenic monomer units have excellent ozone resistance, heat resistance and oil resistance all known. Vulcanizates of these rubbers obtained by using organic peroxides as vulcanizers show hydrogen sulfide resistance and heat resistance under high pressures when used for example, as rubber products for oil wells under very severe conditions. Their steam resistance, however, is still not sufficient, and is desired to be improved.

It is an object of this invention to provide a rubber composition which can meet this desire.

We have extensively worked in order to achieve this object, and now found that the steam resistance of such a hydrocarbon rubber can be improved surprisingly by using a crosslinking coagent in amounts much higher than those normally used in organic peroxide vulcanization.

Thus, the present invention provides a rubber composition having improved steam resistance comprising a nitrile group-containing hydrocarbon rubber having an iodine number of not more than 120, an organic peroxide vulcanizer, and a crosslinking coagent, the amount of said crosslinking coagent being 8 to 30 parts by weight per 100 parts by weight of said rubber.

Because of the need for oil resistance, the nitrile group-containing hydrocarbon rubber in this invention usually contains 10 to 60% by weight, preferably 20 to 45% by weight, of units derived from an unsaturated nitrile. Furthermore, in order for a vulcanizate from the rubber composition of this invention to have excellent ozone resistance and heat resistance, the iodine number of the rubber composition, measured in accordance with JIS K-0070, should be 0 to 120, preferably 0 to 80, and more preferably 0 to 40. If the iodine number exceeds 120, the permanent compression set of the vulcanizate is improved but its heat resistance is reduced.

Examples of the nitrile group-containing hydrocarbon rubber in this invention are a rubber obtained by hydrogenating the conjugated diene unit portion of an unsaturated nitrile/conjugated diene copolymer rubber; an unsaturated nitrile/ethylenically unsaturated monomer/conjugated diene copolymer rubber and a rubber obtained by hydrogenating the conjugated diene unit portion of this rubber; and an unsaturated nitrile/ethylenically unsaturated monomer copolymer rubber. These nitrile group-containing hydrocarbon rubbers can be obtained by using ordinary polymerization techniques an ordinary hydrogenation methods. Needless to say, the method of producing this rubber is not particularly restricted in this invention.

Various monomers can be used to produce the nitrile group-containing hydrocarbon rubbers. Examples of the unsaturated nitrile include acrylonitrile and methacrylonitrile. Examples of the conjugated diene are 1,3-butadiene, 2,3-dimethylbutadiene, isoprene and 1,3-pentadiene. Examples of the ethylenically unsaturated monomer include unsaturated carboxylic acids and salts thereof, such as acrylic acid, methacrylic acid, itaconic acid and maleic acid; esters of the aforesaid unsaturated carboxylic acids, such as methyl acrylate and 2-ethylhexyl acrylate; alkoxyalkyl esters of the aforesaid unsaturated carboxylic acids, such as methoxymethyl acrylate, ethoxyethyl acrylate and methoxyethoxyethyl acrylate; (meth)acrylamide; and N-substituted (meth)acrylamides such as N-methylol(meth)acrylamide, N,N'-dimethylol(meth)acrylamide and N-ethoxymethyl(meth)acrylamide. In the production of the unsaturated nitrile/ethylenically unsaturated monomer copolymer rubber, a part of the unsaturated monomer may be replaced by a non-conjugated diene such as vinylnorbornene, dicyclopentadiene or 1,4-hexadiene.

Specific examples of the nitrile group-containing hydrocarbon rubber used in this invention include rubbers obtained by hydrogenating butadiene/acrylonitrile copolymer rubber, isoprene/butadiene/acrylonitrile copolymer rubber and isoprene/acrylonitrile copolymer rubber; butadiene/methyl acrylate/acrylonitrile copolymer rubber, butadiene/acrylic acid/acrylonitrile copolymer rubber and rubbers obtained by hydrogenating these rubbers; and butadiene/ethylene/acrylonitrile copolymer rubber, butyl acrylate/ethoxyethyl acrylate/vinyl chloroacetate/acrylonitrile copolymer rubber and butyl acrylate/ethoxyethyl acrylate/vinylnorbornene/acrylonitrile copolymer rubber.

The rubber composition of this invention comprises the aforesaid rubbers either alone or as a mixture, and may further include another rubber in amounts which do not impair the essence of this invention.

The vulcanizer to be incorporated in the nitrile group-containing hydrocarbon rubber in this invention is an organic peroxide ordinarily used in the rubber industry or the plastic industry.

Specific examples of the organic peroxide are dicumyl peroxide, di-t-butyl peroxide, t-butyl cumyl peroxide, cumene hydroperoxide, benzoyl peroxide, 2,4-dichlorodibenzoyl peroxide, 2,5-dimethyl-2,5-di(t-butylperoxy)hexyne-3, 1,1-di-(t-butylperoxy)-3,3,5-trimethylcyclohexane, t-butyl peroxybenzoate, 2,5-dimethyl-2,5-di(benzoylperoxy)hexane and 1,3-di(t-butylperoxyisopropyl)benzene.

The crosslinking coagent may be those which are usually employed in organic peroxide vulcanization. A typical example of the crosslinking coagent is a polyfunctional monomer. Examples of the polyfunctional monomer include polyfunctional allyl compounds such as diallyl phthalate, triallyl phosphate, triallyl cyanurate and triallyl isocyanurate; polyfunctional methacrylic acid esters such as ethylene dimethacrylate, triethylene glycol dimethacrylate, tetraethylene glycol dimethacrylate and trimethylolpropane trimethacrylate; polyfunctional maleimide compounds such as tolylene bismaleimide and meta-phenylene bismaleimide; and polyfunctional aromatic vinyl compounds such as divinylbenzene and trivinylbenzene. Polyfunctional oxime compounds such as p-quinone dioxime and p,p'-dibenzoylquinone dioxime and 1,2-polybutadiene may also be used as the crosslinking coagent.

The amount of the organic peroxide is usually 3 to 15 parts by weight per 100 parts by weight of the rubber. Its optimum value may be properly determined according to the kind of the organic peroxide.

The important feature of the present invention is that the amount of the crosslinking coagent greatly exceeds those ordinarily used. The amount of the crosslinking coagent used in this invention is 8 to 30 parts by weight, preferably 10 to 25 parts by weight, per 100 parts by weight of the rubber. If it is less than 8 parts by weight, the steam resistance of the resulting composition is not improved. If it exceeds 30 parts by weight, the composition loses elasticity and becomes resinous and therefore decreases in elongation.

The rubber composition of this invention can be produced by kneading the nitrile group-containing hydrocarbon rubber having an iodine number of not more than 120, the organic peroxide and the crosslinking coagent with various compounding agents normally used in the rubber industry (for example, reinforcing agents such as carbon black and silica, fillers such as calcium carbonate and talc, plasticizers, processing aids, and antioxidants) by ordinary mixers such as rolls and a Banbury mixer. The rubber composition of this invention so obtained is molded by ordinary molding machines into sheets, hoses, tubes, belts, sheets having a metallic or fibrous reinforcing layer sandwiched therein, etc. Subsequent vulcanization by, for example, press vulcanization or pan vulcanization gives the desired rubber products.

The vulcanizates from the rubber composition of this invention have improved steam resistance in addition to ozone resitance, heat resistance and oil resistance which are the inherent characteristics of the nitrile group-containing highly saturated hydrocarbon rubbers. Accordingly, the rubber composition of this invention is especially suitable for use in applications which involve contact with steam and further require oil resistance and heat resistance. Specific examples of such applications include sealing materials such as O-rings, packings and gaskets; various hoses such as risers and marine hoses; diaphragms and valves; cable insulation and sheaths; packers and blow out preventers (B.O.P.) used in oil wells; and rubber articles used in geothermal power plants, heat-exchangers and cooking pressure kettles.

The following examples illustrate the present invention more specifically.

In these examples, the "180 degree bending test" comprises bending a test specimen at its central part in the longitudinal direction, bringing the facing surfaces of the specimen into intimate contact with each other, and returning the specimen to its original condition. When the test specimen broke or cracks occurred in the bent portion in this test, the specimen was determined to be unacceptable. When the test specimen returned to its original condition without the occurrence of cracks, it was determined to be acceptable.

EXAMPLE 1

NBR (bonded acrylonitrile content 33% by weight) obtained by emulsion polymerization was dissolved in methyl isobutyl ketone, and hydrogenated by using a Pd-carbon catalyst to give hydrogenated NBR having an iodine number of 28.

One hundred parts by weight of the NBR or hydrogenated NBR referred to above was blended with 40 parts by weight of FEF carbon black, 5 parts by weight of zinc oxide No. 1, 8 parts by weight (4 parts by weight for NBR) of dicumyl peroxide (purity 40% by weight), trimethylolpropane trimethacrylate (variable amount—see Table 1) and 1 part by weight of stearic acid by means of a 6-inch roll mill to prepare a rubber composition. The composition was press-cured at 160° C. to prepare test specimens. The properties of the test specimens measured in accoradnce with JIS K-6301 are shown in Table 1.

The steam resistance was determined by suspending the specimen in a 1-liter pressure vessel containing 200 ml of water, leaving it to stand for 7 days at 150° C., then measuring its mechanical properties, and calculating percent changes of the measured properties based on its original properties before the test.

TABLE 1

| | Run No. | | | | | | | | | | | |
|---|---|---|---|---|---|---|---|---|---|---|---|---|
| | Hydrogenated NBR | | | | | | | NBR | | | | |
| | Comparison | | | | Invention | | | Reference | | | | |
| Test item | 1 | 2 | 3 | 4 | 5 | 6 | 7 | 8 | 9 | 10 | 11 | 12 |
| Crosslinking coagent (parts by weight) | 0 | 2 | 5 | 7 | 10 | 15 | 20 | 0 | 2 | 5 | 8 | 15 |
| Vulcanization time (minutes) | 30 | 30 | 30 | 30 | 30 | 30 | 30 | 20 | 20 | 20 | 20 | 20 |
| Tensile strength (kg/cm$^2$) | 255 | 260 | 268 | 254 | 310 | 290 | 294 | 240 | 230 | 190 | 200 | 180 |
| Elongation (%) | 230 | 220 | 240 | 220 | 360 | 220 | 180 | 350 | 310 | 280 | 190 | 90 |
| Stress at 100% elongation (kg/cm$^2$) | 50 | 52 | 62 | 63 | 65 | 63 | 68 | 38 | 45 | 62 | 83 | — |
| Hardness (JIS) | 77 | 80 | 79 | 78 | 82 | 82 | 84 | 65 | 68 | 68 | 70 | 71 |
| Stream resistance (150° C. × 7 days) | | | | | | | | | | | | |
| Percent change of tensile strength (%) | −20 | −19 | −18 | −18 | ±0 | +1 | ±0 | * | * | * | * | * |
| Percent change of elongation (%) | −39 | −40 | −42 | −40 | −1 | −2 | −1 | * | * | * | * | * |
| Change of hardness (point) | +8 | +7 | +8 | +6 | +1 | ±0 | ±0 | +19 | +21 | +18 | +19 | +19 |
| 180 degree bending test | O | O | O | O | O | O | O | X | X | X | X | X |

O: Acceptable,
X: Unacceptable,
*: Unmeasurable

EXAMPLE 2

A rubber composition was prepared in the same way as in Example 1 except that the crosslinking coagent was changed to each of the compounds indicated in Table 2 and the hydrogenated NBR was used as the rubber. The composition was press-cured at 160° C. to form test specimens. The properties and steam resistance of the test specimens were measured.

The results are shown in Table 2.

TABLE 2

| Test item | Comparison | | | | | Invention | | | | | | |
|---|---|---|---|---|---|---|---|---|---|---|---|---|
| Run No. | 13 | 14 | 15 | 16 | 17 | 18 | 19 | 20 | 21 | 22 | 23 | 24 |
| Crosslinking coagent | | | | | | | | | | | | |
| Triallyl cyanurate | 5 | | | | | | 15 | | | | | |
| Triallyl isocyanurate | | 5 | | | | | | 15 | | | | |
| Ethylene dimethacrylate | | | 5 | | | | | | 15 | | | |
| Trimethylolpropane trimethacrylate | | | | 5 | | | | | | 15 | | |
| Liquid 1,2-polybutadiene | | | | | 5 | | | | | | 15 | |
| m-phenylene bismaleimide | | | | | | 5 | | | | | | 15 |
| Vulcanization time (minutes) | 30 | 30 | 30 | 30 | 30 | 30 | 30 | 30 | 30 | 30 | 30 | 30 |
| Tensile strength (kg/cm$^2$) | 303 | 294 | 278 | 276 | 292 | 275 | 300 | 291 | 294 | 290 | 301 | 300 |
| Elongation (%) | 410 | 420 | 400 | 360 | 390 | 330 | 270 | 280 | 280 | 240 | 290 | 220 |
| Stress at 100% elongation (kg/cm$^2$) | 54 | 51 | 55 | 53 | 54 | 50 | 59 | 58 | 61 | 63 | 63 | 70 |
| Hardness (JIS) | 77 | 76 | 77 | 78 | 79 | 77 | 83 | 83 | 84 | 82 | 84 | 85 |
| Stream resistance (150° C. × 7 days) | | | | | | | | | | | | |
| Percent change of tensile strength (%) | −14 | −16 | −17 | −16 | −16 | −17 | −3 | −4 | −2 | +2 | −1 | +1 |
| Percent change of elongation (%) | −38 | −38 | −40 | −39 | −39 | −41 | −6 | −7 | −1 | −5 | −2 | −3 |
| Change of hardness (point) | +6 | +8 | +8 | +7 | +7 | +8 | −1 | ±0 | +1 | +1 | +2 | +1 |
| 180 degree bending test | O | O | O | O | O | O | O | O | O | O | O | O |

O: Acceptable

EXAMPLE 3

In the procedure of Example 2, dicumyl peroxide was replaced by (1) 8.6 parts by weight of 2,5-dimethyl-2,5-di(t-butylperoxy)hexane (purity 40% by weight), (2) 8.5 parts by weight of 2,5-dimethyl-2,5-di(t-butylperoxy)hexyne-3 (purity 40% by weight) or (3) 10.0 parts by weight of 1,3-di(t-butylperoxyisopropyl)benzene (purity 40% by weight).

In this case, the same excellent steam resistance as in Table 2 was obtained when the amount of the crosslinking coagent was within the range specified in this invention irrespective of the kinds of the organic peroxide and the crosslinking coagent.

EXAMPLE 4

A rubber composition was prepared in the same way as in Example 1 except that hydrogenated NBR having a different iodine number (bonded acrylonitrile 33% by weight), butadiene/butyl acrylate/acrylonitrile terpolymer rubber (monomer weight ratio 27:32:41) [to be abbreviated BBN(1)], butadiene/butyl acrylate/acrylonitrile terpolymer (monomer weight ratio 5:62:33) [abbreviated BBN (2)], or hydrogenated BBN(1) was used as the rubber. The composition was press-cured at 160° C. to prepare test specimens. The properties and steam resistance of the specimens were tested, and the results are shown in Table 3.

TABLE 3

| Test item | Comparison | | | Invention | | | | | | |
|---|---|---|---|---|---|---|---|---|---|---|
| Run No. | 25 | 26 | 27 | 28 | 29 | 30 | 31 | 32 | 33 | 34 |
| | (a) | (a) | (a) | (b) | (a) | (a) | (a) | (c) | (a) | (d) |
| Iodine number | 314 | 164 | 142 | 117 | 101 | 50 | 35 | 24 | 6 | 10 |
| Organic peroxide (parts by weight) | 5 | 5 | 5 | 8 | 8 | 8 | 8 | 8 | 8 | 8 |
| Crosslinking coagent (parts by weight) | 15 | 15 | 15 | 15 | 15 | 15 | 15 | 15 | 15 | 15 |
| Vulcanization time (minutes) | 20 | 20 | 20 | 30 | 30 | 30 | 30 | 30 | 30 | 30 |
| Tensile strength (kg/cm$^2$) | 180 | 200 | 190 | 294 | 278 | 300 | 285 | 290 | 280 | 294 |
| Elongation (%) | 100 | 190 | 240 | 280 | 290 | 310 | 300 | 320 | 330 | 300 |
| Stress at 100% elongation (kg/cm$^2$) | — | 63 | 70 | 61 | 58 | 64 | 67 | 65 | 68 | 64 |
| Hardness (JIS) | 71 | 70 | 68 | 77 | 80 | 79 | 81 | 83 | 81 | 82 |
| Stream resistance (150° C. × 7 days) | | | | | | | | | | |
| Percent change of tensile strength (%) | * | * | −94 | −7 | −7 | −5 | −2 | −3 | −4 | −1 |
| Percent change of elongation (%) | * | * | −85 | −2 | −1 | −4 | +1 | ±0 | +2 | +1 |
| Change of hardness (point) | +22 | +20 | +19 | +8 | +8 | +9 | +3 | +2 | +1 | +1 |
| 180 degree bending test | X | X | X | O | O | O | O | O | O | O |

(a): hydrogenated NBR,
(b): BBN(1),
(c): BBN(2),
(d): hydrogenated BBN(1)
O: Acceptable,
X: Unacceptable,
*: Unmeasurable 1. A rubber composition having improved steam resistance comprising a nitrile group-containing hydrocarbon rubber having an iodine number of not more than 120 and containing 10 to 60% by weight of units derived from an unsaturated nitrile, an organic peroxide vulcanizer and a crosslinking coagent selected from multiple unsaturated groups-containing monomers, polyfunctional oxime compounds and 1,2-polybutadiene, the amount of said crosslinking coagent being 8 to 30 parts by weight per 100 parts by weight of said rubber.

2. The rubber composition of claim 1 wherein the nitrile group-containing hydrocarbon rubber is selected from hydrogenated unsaturated nitrile/conjugated diene copolymer rubbers, unsaturated nitrile/ethylenically unsaturated monomers/conjugated diene copolymer rubbers, hydrogenated products thereof, and unsaturated nitrile/ethylenically unsaturated monomer copolymer rubbers.

3. The rubber composition of claim 1 wherein the nitrile group-containing hydrocarbon rubber contains from 20 to 45% by weight of units derived from an unsaturated nitrile.

4. The rubber composition of claim 1 wherein the iodine number of the hydrocarbon rubber is not more than 80.

5. The rubber composition of claim 1 wherein the iodine number of the hydrocarbon rubber is not more than 40.

6. The rubber composition of claim 1 wherein the unsaturated nitrile is acrylonitrile or methacrylonitrile.

7. The rubber composition of claim 1 wherein the nitrile group-containing hydrocarbon rubber is a rubber selected from the group consisting of the hydrogenation product of butadiene/acrylonitrile copolymer rubber; the hydrogenation product of isoprene/butadiene/acrylonitrile copolymer rubber; the hydrogenation product of isoprene/acrylonitrile copolymer rubber; butadiene/methylacrylate/acrylonitrile copolymer rubber; butadiene/acrylic acid/acrylonitrile copolymer rubber; the hydrogenation product of butadiene/methacrylate/acrylonitrile copolymer rubber; the hydrogenation product of butadiene/acrylic acid/acrylonitrile copolymer rubber; butadiene/ethylene/acrylonitrile copolymer rubber; butylacrylate/ethoxyethylacrylate/vinyl chloroacetate/acrylonitrile copolymer rubber; and butylacrylate/ethoxyethylacrylate/vinyl norbornene/acrylonitrile copolymer rubber.

8. The rubber composition of claim 1 wherein the crosslinking coagent is a polyfunctional monomer selected from the group consisting of diallyl phthalate, triallyl phthalate, triallyl cyanurate, triallyl isocyanurate, ethylene dimethacrylate, diethylene glycol dimethylacrylate, tetraethylene glycol dimethacrylate, trimethylolpropane trimethacrylate, tolylene bismaleimide, meta-phenylene bismaleimide, divinylbenzene and trivinylbenzene.

9. The rubbber composition of claim 1 wherein the crosslinking coagent is p,p'-dibenzoylquinone dioxime.

10. The rubber composition of claim 1 wherein the crosslinking coagent is 1,2-polybutadiene.

11. The rubber composition of claim 1 wherein the amount of the crosslinking coagent is from 10 to 25 parts by weight, per 100 parts by weight of the rubber.

* * * * *